(12) United States Patent
Granlind

(10) Patent No.: US 7,300,067 B2
(45) Date of Patent: Nov. 27, 2007

(54) TRAILER FOR A BOAT

(75) Inventor: Hans Ingmar Granlind, Öregrund (SE)

(73) Assignee: Anytec Marine AB, Oregrund (SE)

( * ) Notice: Subject to any disclaimer, the term of this patent is extended or adjusted under 35 U.S.C. 154(b) by 418 days.

(21) Appl. No.: 10/506,779

(22) PCT Filed: Mar. 3, 2003

(86) PCT No.: PCT/SE03/00354

§ 371 (c)(1),
(2), (4) Date: Sep. 7, 2004

(87) PCT Pub. No.: WO03/089268

PCT Pub. Date: Oct. 30, 2003

(65) Prior Publication Data

US 2005/0156407 A1    Jul. 21, 2005

(30) Foreign Application Priority Data

Mar. 5, 2002 (SE) .................................. 0200668

(51) Int. Cl.
*B60P 3/10* (2006.01)
(52) U.S. Cl. .................................. 280/414.3; 414/482
(58) Field of Classification Search ................ 414/481, 414/482, 483, 484, 485, 486, 678, 460; 280/414.3; 405/1, 3, 7
See application file for complete search history.

(56) References Cited

U.S. PATENT DOCUMENTS

| | | | | |
|---|---|---|---|---|
| 2,603,369 A | * | 7/1952 | Soderstrom | 414/461 |
| 3,181,717 A | * | 5/1965 | Kumferman | 414/460 |
| 3,442,409 A | * | 5/1969 | Larson | 414/495 |
| 4,440,265 A | * | 4/1984 | Spagnoli | 182/129 |
| 4,538,952 A | * | 9/1985 | Chase | 414/458 |
| 4,880,124 A | * | 11/1989 | Feider et al. | 212/344 |
| 4,915,577 A | * | 4/1990 | Fraser | 414/476 |
| 6,485,247 B1 | * | 11/2002 | Groves et al. | 414/589 |

FOREIGN PATENT DOCUMENTS

| | | | |
|---|---|---|---|
| EP | 0566545 A2 | | 10/1993 |
| SE | 9100808 A | * | 9/1992 |
| SE | 9300764 A | * | 9/1994 |
| SE | 501759 B | * | 5/1995 |
| WO | WO 8700807 A1 | | 2/1987 |
| WO | WO 99/54165 | * | 10/1999 |
| WO | WO 9954165 A1 | | 10/1999 |
| WO | WO 01/68444 A1 | * | 9/2001 |

* cited by examiner

*Primary Examiner*—Lesley D. Morris
*Assistant Examiner*—Daniel Yeagley
(74) *Attorney, Agent, or Firm*—Banner & Witcoff, Ltd.

(57) ABSTRACT

A trailer adaped for a boat that includes a U-shaped chassis having wheels and a number of struts supported by the chassis and slings or the like oriented between struts coordinated in pairs is described. The slings support the boat by abutting against an outer surface of a boat hull. Also, the chassis may be formed by two flexurally rigid branches, each one turnably related and connected with a connecting part of a first end portion of each branch. Further selected struts may consist of one hydraulic piston-cylinder arrangement each. The piston-cylinder arrangements are hydraulically interconnected such that hydraulic oil may be distributed under an overpressure between the arrangements, in correlation with the rocking and/or rolling motion of the hull, including the twisting motion of the branches in relation to the ground and the twisting motion thereof in relation to the connecting part.

24 Claims, 2 Drawing Sheets

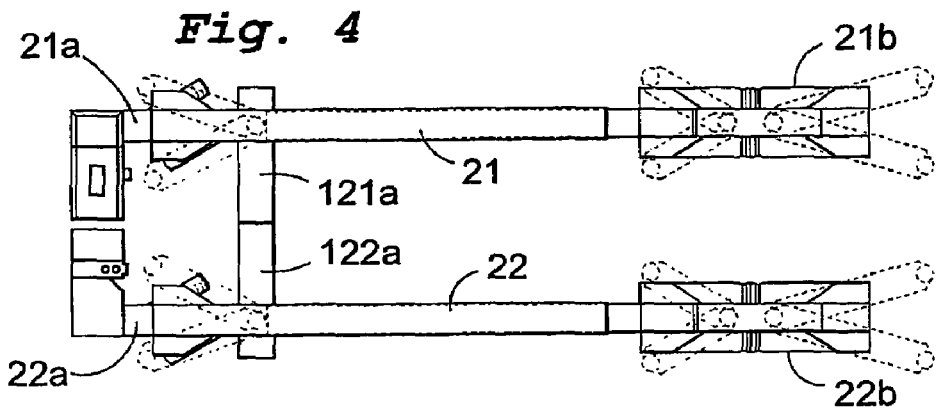
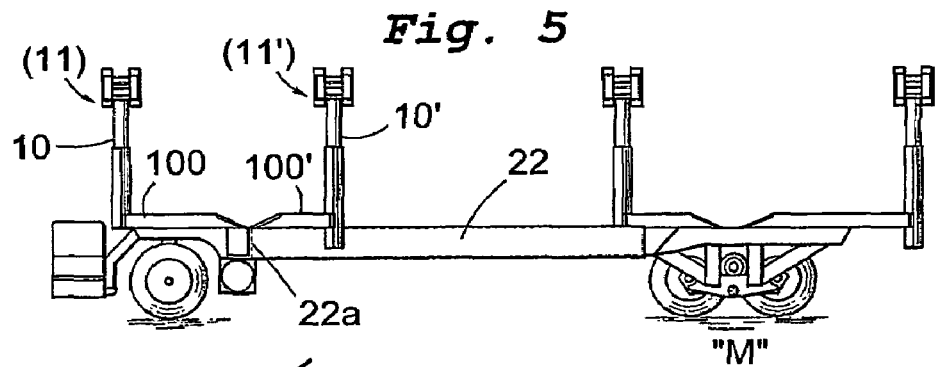
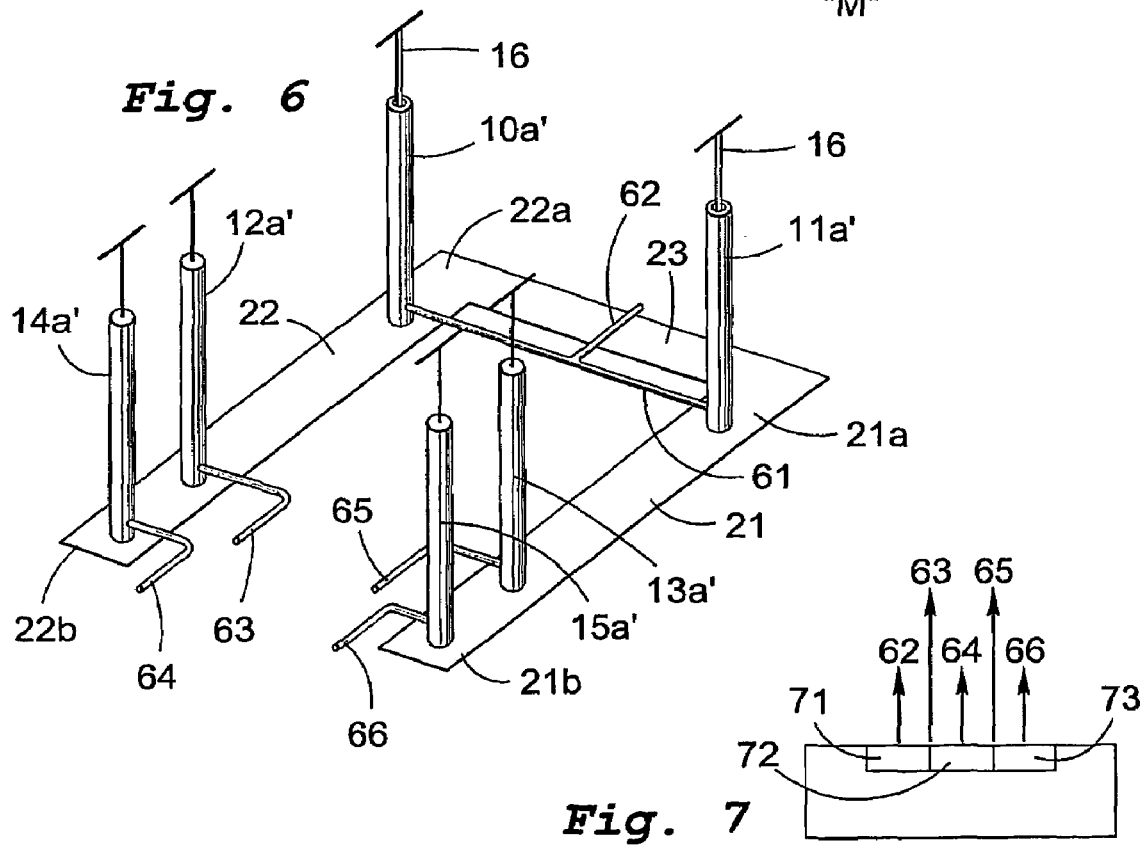

TRAILER FOR A BOAT

TECHNICAL FIELD OF THE INVENTION

The present invention generally relates to a trailer adapted for a boat and more particularly to such a trailer that has a chassis shaped like a "U", provided with a number of wheels for a transport along a substratum and having a number of struts supported by the chassis and one or more slings, so called carrying slings, or the like oriented between struts coordinated in pairs, which slings are intended to support said boat by directly or indirectly abutting against an outer surface of a hull belonging to the boat.

More particularly the object of the matter is a trailer designed for boats, where said chassis is formed by two branches, the front and rear end portions of which are provided with wheels, where each one of the branches are turnably related and connected with a connecting part of a first, forward, end portion of the respective branch.

At least selected struts should here consist of hydraulically operating piston-cylinder arrangements, connected to a hydraulic-pressure-generating unit via actuator valves in order to be able to lift and lower the slings and thereby the hull of the boat by means of pressurised hydraulic oil.

The invention has been devised in order to be able to provide a trailer for boats, primarily engine-driven boats, having a buoyancy of, lets say, up to 500 ton and where the subsequent description is relating to approx. 100 ton.

BACKGROUND OF THE INVENTION

Methods and arrangements to construct trailers for boats are previously known in a number of different embodiments.

As an example of the background of the invention and the technical field to which the invention relates, it may be mentioned that, at least by public practice, previously a trailer adapted for a boat is known, having a chassis shaped like a "U", provided with wheels and having a number of vertically adjustable struts supported by the chassis and one or more carrying slings or the like oriented between struts coordinated in pairs, which slings are intended to let said boat be supported hanging in the same carrying slings by directly or indirectly abutting against an outer surface of a hull belonging to the boat.

Said chassis is formed by two flexurally rigid branches, each one being turnably related and connected with a connecting part of a first end portion of the respective branch and where at least one strut, out of a selected number of struts, consists of a hydraulically operating piston-cylinder arrangement, having the cylinder part facing towards and attached to the chassis and the piston part arranged movable up and down by means of a hydraulic oil supplied or drawn off via valve arrangements designed for this.

A trailer, of this category, has piston-cylinder arrangements coordinated in pairs, one pair for the stem of the boat, one or two pairs for the stern of the boat, and which are vertically adjustable in synchronism, in order to keep the hull of the boat hanging in carrying slings.

One or both of the astern carrying slings will come to carry the main part of the weight of the boat, with a larger friction effect activable between the carrying slings and the astern portion of the hull of the boat, while the forward carrying sling will come to carry a considerably lesser part of the weight of the boat, with a considerably lesser friction effect activable between the carrying sling and the forward portion of the hull of the boat.

This implies that a rocking or rolling of the hull of the boat, about a longitudinal axis assigned to the hull of the boat, caused primarily by a twisting of one branch relative the other branch in relation to the connecting part, will, by virtue of the lesser friction effect, create a relative motion between the forward carrying sling and the forward portion of the hull of the boat, a relative motion that normally may inflict larger or smaller damages to the forward portion of the hull of the boat as well as normally may inflict wear of the carrying sling.

DESCRIPTION OF THE PRESENT INVENTION

Technical Problems

Taken into consideration the circumstance that the technical deliberations that a professional skilled in the appurtenant technical field has to do to be able to offer a solution of one or more technical problems encountered, is on one hand initially required an insight of the measures and/or the sequence of measures that are to be taken and, on the other hand, a necessary choice of the one or several means that are required, owing to this the subsequent technical problems will be relevant at the creation of the subject matter of the present of invention.

In view of the standpoint of the prior art, such as it has been described above, therefore it should be appreciated as a technical problem to be able to understand the significance of and the advantages associated with—at a trailer adapted for a boat, having a chassis shaped like a "U", provided with wheels and having a number of struts supported by the chassis and one or more slings, so called carrying slings, or the like oriented between struts coordinated in pairs, which slings are intended to support said boat by directly or indirectly abutting against an outer surface of a hull belonging to the boat, said chassis being formed by two flexurally rigid branches, each one being turnably related and connected with a connecting part of a first end portion of the respective branch and where at least selected struts should consist of a hydraulically operating piston-cylinder arrangement—being able to offer a construction that entirely can eliminate the drawbacks that has been described above in conjunction with the prior art.

Likewise, there is a technical problem to be able to appreciate the significance of and the advantages associated with the utilisation of a hydraulic coupling arrangement, where the struts, belonging to the first, forward, end portion of the branches, consist of at least one piston-cylinder arrangement assigned to the respective branch, that these are coordinated by means of at least one sling or the like, adapted to being able to support a forward portion assigned to the hull of the boat, and that these piston-cylinder arrangements are hydraulically directly interconnected with each other, such that, while a selected hydraulic pressure keep the boat hanging, one of the arrangements can be elevated while the other arrangement can be lowered and vice versa, all in dependence of the rocking or rolling of the hull of the boat, by means of letting hydraulic oil, under the chosen pressure, be conveyed, via a line, from one of the piston-cylinder arrangements to the other and vice versa.

There is a technical problem to be able to appreciate the significance of and the advantages associated with then allowing this hydraulic interconnection to be adapted to, via a well adapted hydraulic oil line, adaptedly fast being able to apportion hydraulic oil between the same arrangements, primarily dependent on the rocking or rolling motion of the hull of the boat in relation to the chassis, while specially taking into consideration the motions that are to be related to the motions of the branches in relation to said connecting part, all while the trailer is moved along an uneven substratum.

In that connection, it is a technical problem to be able to appreciate the significance of and the advantages associated with allowing to create such provisions at a trailer for boats of the above-mentioned nature that the forwardly arranged struts should be coordinated in pairs and oriented to or at least adjacent to each one of the first, forward, end portion of the branches.

In that connection, it is a technical problem to be able to appreciate the significance of and the advantages associated with allowing to create such provisions at a trailer for boats of the above-mentioned nature that the forwardly arranged struts, in the form of piston-cylinder arrangements, should, what concerns the cylinder parts, be hydraulically directly interconnected to each other.

In that connection, it is a technical problem to be able to appreciate the significance of and the advantages associated with allowing to create such provisions at a trailer for boats of the above-mentioned nature that the astern arranged struts should be coordinated in pairs and oriented to each one of the second end portion of the branches.

In that connection, it is a technical problem to be able to appreciate the significance of and the advantages associated with creating such provisions at a trailer for boats of the above-mentioned nature that astern arranged struts, in the form of piston-cylinder arrangements, for one branch each should be able to be hydraulically directly interconnected to each other via valve arrangements.

In that connection, it is a technical problem to be able to appreciate the significance of and the advantages associated with creating such provisions at a trailer for boats of the above-mentioned nature that forwardly arranged struts coordinated in pairs, in the form of piston-cylinder arrangements, should be connected to a first hydraulic-pressure-generating arrangement.

In that connection, it is a technical problem to be able to appreciate the significance of and the advantages associated with allowing to create such provisions at a trailer for boats of the above-mentioned nature that astern arranged struts coordinated in pairs, in the form of piston-cylinder arrangements, one pair for one branch each, should be connected via valve arrangements to a second ydraulic-pressure-generating arrangement.

In that connection, it is a technical problem to be able to appreciate the significance of and the advantages associated with creating such provisions at a trailer for boats of the above-mentioned nature that astern arranged additional struts coordinated in pairs, in the form of piston-cylinder arrangements, one pair for one branch each, should be connected via valve arrangements to a third hydraulic-pressure-generating arrangement.

In that connection, it is a technical problem to be able to appreciate the significance of and the advantages associated with allowing to create such provisions at a trailer for boats of the above-mentioned nature that the respective flexurally rigid branch at least should be able to have two parts, displaceably related to each other and attachable to each other in predetermined or arbitrary set positions.

There is a technical problem to be able to appreciate the significance of and the advantages associated with creating such provisions at a trailer for boats of the above-mentioned nature that strut-assigned piston-cylinder arrangements for the second or astern end portion of one of the branches should via valve arrangement be able to be directly hydraulically connected.

There is a technical problem to be able to appreciate the significance of and the advantages associated with allowing to create such provisions at a trailer for boats of the above-mentioned nature that strut-assigned piston-cylinder arrangements for the second or astern end portion of the other branch should via valve arrangement be able to be directly hydraulically connected.

In that connection, it is a technical problem to be able to appreciate the significance of and the advantages associated with allowing to create such provisions at a trailer for boats of the above-mentioned nature that all struts should be turnably mounted to the appurtenant branch thereof via a horizontally oriented arm for an automatic adaptation to the width of the hull of the boat.

In that connection, it is a technical problem to be able to appreciate the significance of and the advantages associated with creating such provisions at a trailer for boats of the above-mentioned nature that each selected strut by the twisting motion thereof should be adapted to be able to assume any set position between an end position at one side, the inside, of the branch and an end position at the other side, the outside, of the branch.

In that connection, it is a technical problem to be able to appreciate the significance of and the advantages associated with allowing to create such provisions at a trailer for boats of the above-mentioned nature that the mounting of the arm in the first, forward, end portion of the branch should be oriented at or adjacent to the connecting part of the first end portions of the branches.

There is a technical problem to be able to appreciate the significance of and the advantages associated with creating such provisions at a trailer for boats of the above-mentioned nature that a pair of wheels assigned to the second or astern end portion of each branch should be assigned a bogie.

There is a technical problem to be able to appreciate the significance of and the advantages associated with creating such provisions at a trailer for boats of the above-mentioned nature that branch-assigned wheels necessary for the steering of the chassis should be arranged in front of, as seen in the direction of transport, the connecting part of the first, forward, end portions of the branches.

There is a technical problem to be able to appreciate the significance of and the advantages associated with being able to create such provisions at a trailer for boats of the above-mentioned nature that the first end portion of the respective branch should have a sleeve-shaped bearing member, assigned a length within a range of 10%, to 40%, especially within a range of 20% to 30% of the length assigned to the connecting part of the first end portion of the respective branch.

In that connection, it is a technical problem to be able to appreciate the significance of and the advantages associated with allowing to create such provisions at a trailer for boats of the above-mentioned nature that among selected struts assigned to the second, astern, end area, two should be coordinated and turnably mounted to the appurtenant branch thereof via one horizontally oriented arm each.

In that connection, it is a technical problem to be able to appreciate the significance of and the advantages associated with creating such provisions at a trailer for boats of the above-mentioned nature that each such strut should be adapted to be able to assume any set position between an end position at one side, the inside, of the branch and an end position at the other side, the outside, of the branch.

In that connection, it is a technical problem to be able to appreciate the significance of and the advantages associated with allowing to create such provisions at a trailer for boats of the above-mentioned nature that the mountings of the arms in the second, astern, end portion of the branch should be oriented at or adjacent to the pair of wheels assigned to the second end portion of the branches.

There is a technical problem to be able to appreciate the significance of and the advantages associated with, via the connecting part, in the form of a round shaft, being able to adjust the distance between the branches in order to fit the width of a transported hull of a boat.

In that connection, it is a technical problem to be able to appreciate the significance of and the advantages associated with creating such provisions at a trailer for boats of the above-mentioned nature that said sleeve-shaped bearing members become adapted to directly or indirectly being able to interact with each other end against end and turnably, in order to thereby allow the branches to assume a position adapted for transportation without boat or a boat of small width (transport position to and from place of service).

The Solution

In that connection, the present invention proceeds from the known technique at a trailer for a boat referred to in the introduction, having a chassis shaped like a "U", provided with wheels and having a number of struts supported by the chassis and one or more slings or the like oriented between struts coordinated in pairs, which slings are intended to support said boat by directly or indirectly abutting against an outer surface of a hull belonging to the boat.

Said chassis is formed by two flexurally rigid branches, each one turnably related and connected with a connecting part of a first end portion of the respective branch and where at least selected struts consist of a hydraulically operating piston-cylinder arrangement.

Now, in order to be able to solve one or more of the above-mentioned technical problems, at such a trailer the present invention teaches that the struts, belonging to the first end portions of the branches, should consist of at least one piston-cylinder arrangement assigned to the respective branch, where the same are coordinated by means of at least one sling or the like, adapted to a forward portion assigned to the hull of the boat.

Then, these piston-cylinder arrangements should be hydraulically directly interconnected with each other and that this interconnection then is adapted to let hydraulic oil be distributed under a selected overpressure between the same arrangements in dependence of the rocking or rolling motion of the hull of the boat in relation to the chassis, especially emanating from the motion of the flexurally rigid branches in relation to each other and in relation to said connecting part.

As proposed embodiments, being within the scope of the fundamental idea of the present invention, is taught that the forwardly arranged struts should be coordinated in pairs, one to one each of the first end portions of the branches.

Further, it is taught that the forwardly arranged struts, in the form of piston-cylinder arrangements, should be hydraulically directly (without valve arrangement) interconnected to each other.

Further, it is taught that the astern arranged struts should be oriented to and coordinated in pairs to each of the second end portions of the branches.

The invention suggests that the astern arranged struts, in the form of piston-cylinder arrangements, for one branch each should, via valve arrangement, be able to be hydraulically directly interconnected to each other.

In addition, it is taught that forwardly arranged struts coordinated in pairs, in the form of piston-cylinder arrangements should, via a valve arrangement, be connected to a first hydraulic-pressure-generating arrangement.

Further, it is taught that astern arranged struts coordinated in pairs, in the form of piston-cylinder arrangements, one for one branch each should, via a valve arrangement, be connected to a second hydraulic-pressure-generating arrangement.

Furthermore, it is taught that astern arranged additional struts coordinated in pairs, in the form of piston-cylinder arrangements, one for one branch each should, via a valve arrangement, be connected to a third hydraulic-pressure-generating arrangement.

The respective branch should advantageously have at least two parts, displaceably related to each other and attachable to each other at a predetermined or an arbitrarily selected set position.

Further, it is taught that strut-assigned piston-cylinder arrangements, for the second or astern end portion of one of the branches should, via valve arrangement, be able to be directly hydraulically interconnected.

Strut-assigned piston-cylinder arrangements for the second or astern end portion of the other branch may, also via valve arrangement, advantageously be directly hydraulically interconnected.

Selected struts, like the total lot, are turnably mounted to the appurtenant branch thereof via a horizontally oriented arm, whereby each selected strut may be adapted to be able to assume any arbitrary position between an end position at one side, the inside, of the branch and an end position at the other side, the outside, of the branch.

Further, it is taught that the mounting of the arm in the first, forward, end portion of the branch could be oriented at or adjacent to the connecting part of the first end portion of the branches.

Further, it is taught that branch-assigned wheels necessary for the steering of the chassis should be arranged forwardly to the connecting part of the first, forward, end portions of the branches.

Specially, it is taught that the first end portion of the respective branch should have a sleeve-shaped bearing member, assigned a length within a range of 10% to 40% especially within a range of 20% to 30% of the length assigned to the connecting part of the first end portion of the respective branch.

Further, it is taught that among a plurality of selected struts assigned to the second, astern, end area, at least two coordinated should be turnably mounted to the appurtenant branch thereof via a horizontally oriented arm each.

Then, each such strut may be adapted to be able to assume any arbitrary position between an end position at one side, the inside, of the branch and an end position at the other side, the outside, of the branch.

The mountings of the arms in the second, astern, end portion of the branch should be oriented at or adjacent to the pair of wheels assigned to the second end portion of the branch.

Further, it is taught that said sleeve-shaped bearing members should be adapted to directly or indirectly (via the connecting part) be able to interact with each other, in order to allow the branches assume a position adapted for transportation without boat.

Advantages

The advantages that first of all are to be appreciated as characteristic of the present invention and the particular significative features taught thereby is that in this way provisions have been created to be able to transport a boat on a trailer, having movable or turnable mountings of two flexurally rigid branches to a connecting part of the branches, and by a special hydraulic direct interconnection of forward struts, in the form of piston-cylinder arrangements, the rocking or rolling movements of the boat, inter alia by virtue of the twisting motions of the branches dependent on irregularities of the substratum or the ground, can be allowed without any relative motion between the forward part section of the hull of the boat and a carrying sling or the like oriented there.

What first of all is to be appreciated as characteristic of the present invention is stated in the subsequent characterizing clause of claim 1.

BRIEF DESCRIPTION OF THE DRAWINGS

Two embodiments proposed at present, having the significative features associated with the invention associated, will now for the purpose of exemplifying be described in more detail with reference to appended drawing, where:

FIG. 6 shows a hydraulic coupling arrangement for utilized struts in the form of hydraulic piston-cylinder arrangements, according to the embodiment shown in FIG. 2 and FIG. 7 schematically shows a hydraulic-pressure-generating unit in order to, via valve arrangement, be able to supply different arrays of struts and piston-cylinder arrangements with pressurised hydraulic oil and via the same valve arrangement being able to evacuate supplied hydraulic oil.

DESCRIPTION OF EMBODIMENT PRESENTLY PROPOSED

By way of introduction, then it has to be emphasised that in the subsequent description of an embodiment presently proposed, which has the significative features associated with the invention and which is elucidated by the displayed figures in the subsequent drawings, we have had technical terms and a particular terminology chosen with the intention, in that connection, to primarily have the fundamental idea of the invention made clear.

However, in this context it should be taken into consideration that expressions chosen here are not to be perceived as limited merely to the terms employed and chosen here, but it should be implicit that each term chosen in this way should be interpreted such that it in addition includes all technical equivalents that functions in the same or substantially the same way in order to thereby be able to achieve the same or substantially the same intention and/or technical effect.

Figure 1:
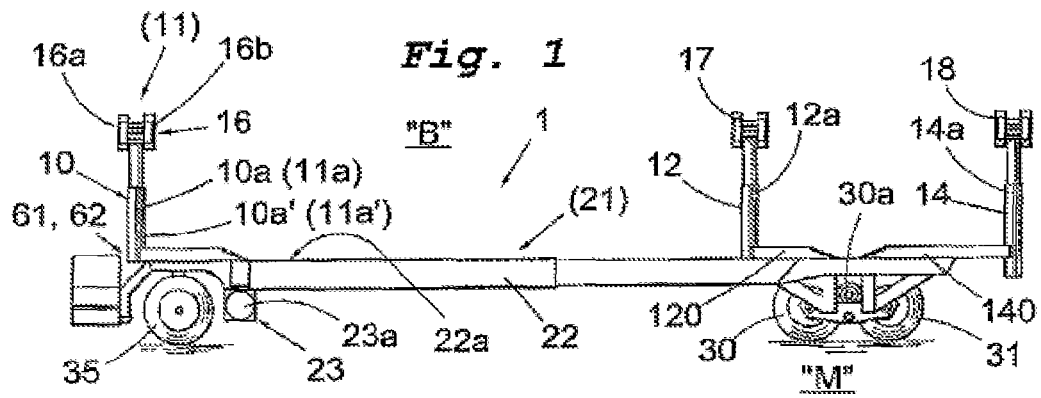
FIG. 1 in a side view shows a first embodiment of a trailer designed for a boat, which trailer is adapted for a boat having the buoyancy of approx. 100 ton, FIG. 2 in a horizontal view shows the trailer according to FIG. 1, FIG. 3 in a frontal view shows the trailer according to FIG. 1, FIG. 4 in a horizontal view shows the trailer according to FIG. 2 in a joined position intended for transportation without boat or a boat of small width, FIG. 5 in a side view shows a second embodiment of a trailer designed for a boat, having two forward struts assigned one branch each.

With reference to FIG. 1, there the fundamental conditions of the present invention are schematically shown and where they are generally concretised by the significant features associated with the invention, by an embodiment presently proposed and shown in more detail in the subsequent in appended drawings and by two embodiments disclosed in more detail in the subsequent description.

Accordingly, from the FIGS. 1 to 4 the fundamental conditions for a trailer 1 adapted for a boat "B" is apparent, the trailer having (specially shown in FIG. 2 and FIG. 4) a "U"-shaped chassis 2 provided with wheels and having a number of struts 10, 11; 12, 13; 14, 15 supported by the parallel flexurally rigid branches 21, 22 of the chassis 2 and oriented sling 16, 17, 18 or the like between struts 10, 11; 12, 13; 14, 15 coordinated in pairs and assigned to the respective branch 21, 22, which slings are intended to suspend said boat "B" by directly or indirectly abutting against an outer surface of a hull belonging to the boat, said chassis 2 being formed by said two flexurally rigid branches 21, 22, each one turnably related to and connected with a connecting part 23 of a first, forward, end portion 21a, 22a of the respective branch, in the form of a cylindrical shaft, and where at least selected struts consist of a hydraulically operating piston-cylinder arrangement, assigned the reference designations 10a, 11a; 12a, 13a; 14a, 15a.

The subsequent description will assign the branches a first, a "forward", end portion 21a, 22a and a second, an "astern", end portion 21b, 22b, in order to thereby indicate the boat-related positioning of the end portions belonging to the branches.

The struts 10, 11 belonging to the first, forward, end portions 21a, 22a of the branches 21, 22 consist of piston-cylinder arrangement 10a, 11a assigned to at least the respective branch 21, 22 and that the same arrangements are coordinated by means of at least one sling 16 (or at heavier boats double slings 16a, 16b) or the like, here illustrated as a carrying sling 16, adapted for a forward portion belonging to the hull of the boat.

Said piston-cylinder arrangements 10a, 11a are hydraulically directly interconnected (according to FIG. 6) to each other via a line 61 and that this interconnection then becomes adapted to being able to distribute hydraulic oil under an conditioned overpressure between the same arrangements 10a, 11a in dependence of the rocking or rolling motion of the hull of the boat from the twisting motion of the branches 21, 22 in relation to each other and in relation to said connecting part 23 and where this rocking or rolling motion primarily is to be related to irregularities in the substratum or ground "M", against which wheels 30, 31; 32, 33, assigned one second, astern, end portion 21b, 22b each of one branch each, will rest.

From the figures it is apparent that the forwardly arranged struts 10, 11 are oriented or coordinated in pairs to each of the first end portions 21a, 22a of the branches.

The forwardly arranged struts 10, 11, illustrated in the form of piston-cylinder arrangements 10a, 11a, having the cylinder parts 10a', 11a' thereof attached to the respective branch, are hydraulically directly interconnected to each other via hydraulic lines 61, 62 and a valve arrangement.

The embodiment according to the FIGS. 1 to 4 shows that the astern arranged struts 12, 13; 14, 15 are oriented in pairs 12, 14; 13, 15 and coordinated to one each of the second end portion 21b, 22b of the branches.

The astern arranged struts 12, 14; 13, 15, also here in the form of piston-cylinder arrangements 12a, 14a; 13a, 15a, for one branch 21, 22 each, may be hydraulically directly interconnected to each other via valve arrangements.

The line 63 is connected to the cylinder part 12a', the line 64 is connected to the cylinder part 14a' and these are supplied with pressurised hydraulic oil via valve arrangements.

The line 65 is connected to the cylinder part 13a', the line 66 is connected to the cylinder part 15a' and these are supplied with pressurised hydraulic oil via valve arrangements.

The forwardly arranged struts 10, 11 related or coordinated in pairs, also here in the form of piston-cylinder arrangements, should via the line 62 and a valve arrangement be connected to a first hydraulic-pressure-generating arrangement 71 (according to FIG. 7).

The astern arranged struts 12, 14 related in pairs, also here in the form of piston-cylinder arrangements 12a, 14a, may via lines 63 and 64 and a valve arrangement be connected to a second hydraulic-pressure-generating arrangement 72.

Astern arranged additional struts 13, 15 related in pairs, also here in the form of piston-cylinder arrangements 12a, 14a, may via lines 65, 66 and a valve arrangement be connected to a third hydraulic-pressure-generating arrangement 73.

For a person skilled in the art it is evident that, via the valve arrangements that control the hydraulic pressure to and the coordination between arrangements 12a, 14a; 13a, 15a, a plurality of different interconnections, series connections and/or parallel connections may be realized depending upon demands and desired results.

In order to be able to offer an adaptation of the length of the trailer to the length of the hull of the boat it is taught that the respective branch 21, 22 at least should have two parts 140a, 140b and 141a, 141b, respectively, displaceably related in to and out of each other and attachable to each other at a predetermined number of different or arbitrary positions, in order to, in that way, adapt the wheelbase to the length of the boat, weight distribution, etc.

Strut-assigned piston-cylinder arrangements 13a, 15a for the second or astern end portion 21b of one of the branches 21 may thus via valve arrangement be directly hydraulically interconnected to each other.

Strut-assigned piston-cylinder arrangements 12a, 14a for the second or astern end portion 22b of the other branch 22 may thus via valve arrangement also be directly hydraulically interconnected to each other.

All struts should be turnably mounted to the appurtenant branch thereof 21, 22 via one horizontally oriented arm each, such as the arms 110, 100, for the struts 10, 11.

One or more of the struts selected in this way are adapted to be able to assume any selected set position between two chosen end positions, one end position at one side, the inside, of the branch and one end position at the other side, the outside, of the branch, which end positions are indicated by means of dashed lines.

More particularly the object is to allow the mounting of the arm 100, 110 in the first, forward, end portion 21a, 22a of the branch to be oriented at or adjacent to the connecting part 23 of the first end portions of the branches.

The second or astern end portion of each branch is assigned a pair of wheels 30, 31; 32, 33 and said pairs of wheels (30, 31) are assigned a bogie or bogie structured.

Then, here it is suggested that one of a hydraulic motor-driven driving gear 30a should, for a reel drive, be arranged between the wheels 30, 31 within the pair of wheels and pressed against the upper portion of the same wheels. The rest of the pairs of wheels are provided with similar hydraulic motor and driving gear.

Further, it is suggested that branch-assigned, pairs of wheels 35, 36 required for a steering of the chassis should be arranged forwardly to the connecting part 23 of the first, forward, end portions of the branches.

More particularly, concerning the turnable mounting, it is suggested that the first end portion 21a, 22a of the respective branch 21, 22 should have a sleeve-shaped bearing member 121a, 122a.

Said bearing members, embedded in a unit of square cross-section, should then interact with a round shaft 23a and be assigned a length "L1" within a range of 10% to 40%, especially within a range of 20 to 30%, of the length "L" assigned to the connecting part 23 of the first end portions of the respective branch.

Selected struts 12, 14, assigned to the second, astern, end area 22b, should at least, two by two, be turnably mounted to the appurtenant branch thereof via one horizontally oriented arm 120, 140 each.

Figure 2:
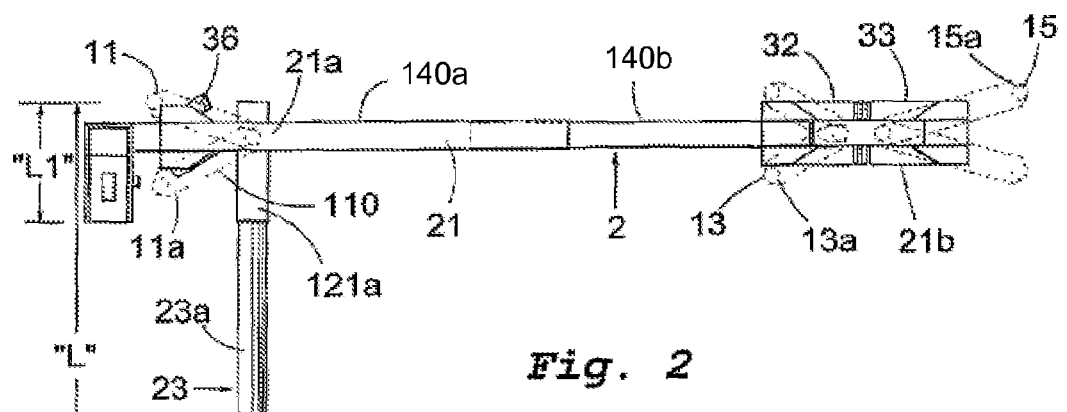
Figure 3:
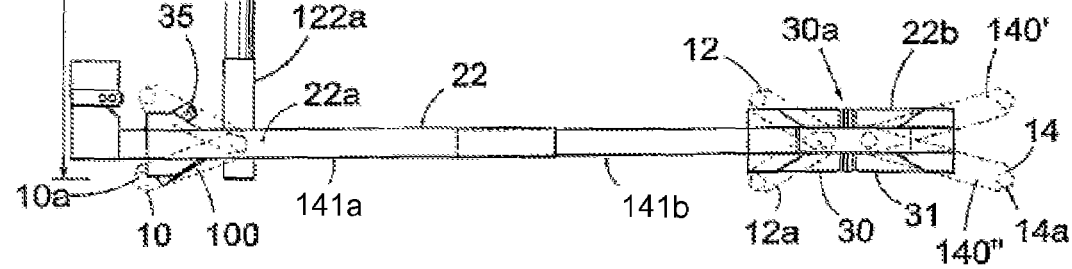

In that connection, each such strut is adapted to be able to assume any arbitrarily intermediate position between an end position 140' at one side, the inside, of the branch or an end position at the other side 140", the outside, of the branch, according to the dashed positions according to FIG. 2.

The mountings of the arms in the second, astern, end portion of the branch are oriented and coordinated at or adjacent to the pair of wheels 30, 31 assigned to the second end portion of the branches.

Said sleeve-shaped bearing members 121a, 122a are adapted to be able to assume an arbitrary position along the shaft 23a in order to, in that connection, adapt the distance between the branches 21, 22 to the width of the transported boat.

According to FIG. 4, said sleeve-shaped bearing members 121a, 122a are here adapted in such a way that they directly or indirectly should be able to interact with each other at a twisting motion, in order to allow for the branches 21, 22 to assume a position oriented close to each other and adapted for a road transport without boat or a boat of small width. Here, the branches 21, 22 are illustrated in a fully joined position.

FIG. 5 shows an embodiment, resembling the one in FIG. 1, where the forward struts 10, 11 have been completed with additional struts 10', 11', also these (such as 10') interacting with the branch 22 via an arm 100'.

Of course, the invention is not limited to the above embodiment given as an example but may be subject to modifications within the scope of the general idea of the invention illustrated in the subsequent claims.

In particular, it should be taken into consideration that each unit shown may be combined with any other unit shown within the scope in order to be able to attain desired technical function.

This invention claimed is:

1. A trailer adapted for a boat, the trailer comprising:
   a substantially U-shaped chassis including two branches connected to a connecting part at a first end portion of each of the two branches;
   a plurality of wheels;
   a first pair of struts, wherein a first strut of the first pair of struts is connected to the first end portion of a first branch of the two branches of the substantially U-shaped chassis and a second strut of the first pair of struts is connected to the first end portion of a second branch of the two branches of the substantially U-shaped chassis;
   a second pair of struts, wherein a third strut of the second pair of struts is connected to a second end portion of the first branch and a fourth strut of the second pair of struts is connected to a second end portion of the second branch; and a sling oriented between the first strut and the second strut of said first pair of struts, the sling configured to support the boat by abutting against an outer surface of a hull of the boat, wherein the first strut of the first pair of struts includes a first hydraulic operated piston-cylinder arrangement and the second strut of the first pair of struts includes a second hydraulic operated piston-cylinder arrangement, the first and second piston-cylinder arrangements being coordinated by the sling which is configured to interact with a forward portion assigned to the hull of the boat and wherein the first and second piston-cylinder arrangements are hydraulically directly interconnected such that hydraulic oil is distributed, under an overpressure, between the first and second piston-cylinder arrangements in response to a rocking or rolling motion of the hull of the boat.

2. The trailer according to claim 1, wherein the first pair of struts are forwardly arranged struts.

3. The trailer according to claim 1, wherein the second pair of struts are astern arranged struts.

4. The trailer according to claim 3, wherein the third strut of the second pair struts includes a third piston-cylinder arrangement hydraulically connected to a fourth piston-cylinder arrangement of the fourth strut of the second pair of struts.

5. The trailer according to claim 1, wherein the first strut is a forwardly arranged strut, and wherein the first piston-cylinder-arrangement is connected to a hydraulic-pressure-generating arrangement via a valve arrangement.

6. The trailer according to claim 1, wherein the third strut is a first astern arranged strut and includes a third piston-cylinder arrangement connected to a hydraulic-pressure-generating arrangement via a valve arrangement.

7. The trailer according to claim 6, wherein the fourth strut is a second astern arrange strut and includes a fourth piston-cylinder arrangement connected to a second hydraulic-pressure-generating arrangement via a second valve arrangement.

8. The trailer according to claim 1, wherein each of the two branches includes at least two parts, wherein the at least two parts are telescopically attachable to each other at a plurality of positions.

9. The trailer according to claim 1, wherein a third piston-cylinder arrangement and a fourth piston-cylinder arrangement of the second end portion of the first branch are directly hydraulically interconnected through a valve arrangement.

10. The trailer according to claim 1, characterized in a third piston-cylinder arrangement and a fourth piston-cylinder arrangement of the second end portion of the second branch are directly hydraulically interconnected through a valve arrangement.

11. The trailer according to claim 1, characterized in that the first strut is mounted to the first branch via a horizontally oriented arm.

12. The trailer according to claim 1, wherein the first strut is configurable to assume a plurality of positions between a first position where the horizontally oriented arm extends toward a first side of the first branch and a second position where the horizontally oriented arm extends toward a second side of the first branch.

13. The trailer according to claim 11, characterized in that a mounting of the horizontally oriented arm is oriented at or adjacent to the connecting part of the first end portion of the first branch.

14. The trailer according to claim 1, characterized in that at least one of the plurality of wheels is connected to an astern end portion of the first branch and wherein the at least one of the plurality of wheels is assigned a bogie.

15. The trailer according to claim 14, characterized in that a driving gear driven by a motor is arranged between the plurality of wheels.

16. The trailer according to claim 1, characterized in that the plurality of wheels are located proximate to the connecting part on at least one of the two branches.

17. The trailer according to claim 1, characterized in that the first end portion of each of the two branches includes a sleeve-shaped bearing member having a first length within a range of 10% to 40% of a second length of the connecting part and wherein the sleeve-shaped bearing member is configured to receive a first end of the connecting part.

18. The trailer according to claim 17, characterized in that said sleeve-shaped bearing members are adapted to interact with each other to allow the first and second branches to assume a position configured for transportation without the boat.

19. The trailer according to claim 18, characterized in that a first end portion of the sleeve-shaped bearing members are attached to each other so as to enable a twisting motion of the first and second branches.

20. The trailer according to claim 18, characterized in that the sleeve-shaped bearing members are displaceably arranged along said connecting part such that the sleeve-shaped bearing members may be configured to support boats of differing width.

21. The trailer according to claim 1, characterized in that the first end portion of each of the two branches includes a sleeve-shaped bearing member having a first length within a range of 20% to 30% of a second length of the connecting part and wherein the sleeve shaped bearing member is configured to receive a first end of the connecting part.

22. The trailer according to claim 1, wherein the third strut located in the second end portion of the first branch is mounted to the first branch through a horizontally oriented arm.

23. The trailer according to claim 22, wherein the third strut is configurable to assume a plurality of positions between a first position where the horizontally oriented arm extends toward a first side of the first branch and a second position where the horizontally oriented arm extends toward a second side of the first branch.

24. The trailer according to claim 22, wherein a mounting of the horizontally oriented arm is located proximate to at least one of the plurality of wheels located at the second end portion of the first branch.

* * * * *

UNITED STATES PATENT AND TRADEMARK OFFICE
CERTIFICATE OF CORRECTION

PATENT NO.        : 7,300,067 B2
APPLICATION NO. : 10/506779
DATED             : November 27, 2007
INVENTOR(S)       : Hans Ingmar Granlind Page 1 of 1

It is certified that error appears in the above-identified patent and that said Letters Patent is hereby corrected as shown below:

In Column 11, Claim 12, Line 60:
    Please replace "claim 1" with --claim 11--.

Signed and Sealed this

Second Day of June, 2009

JOHN DOLL
*Acting Director of the United States Patent and Trademark Office*